US006034802A

United States Patent [19]
Feng

[11] Patent Number: 6,034,802
[45] Date of Patent: Mar. 7, 2000

[54] WIRELESS COMMUNICATIONS SYSTEMS WITH SELF THRESHOLD SETTING

[75] Inventor: Kai Di Feng, North York, Canada

[73] Assignee: International Business Machines Corporation, Armonk, N.Y.

[21] Appl. No.: 08/997,971

[22] Filed: Dec. 24, 1997

[30] Foreign Application Priority Data

Dec. 24, 1996 [CA] Canada ................................ 2194022

[51] Int. Cl.[7] ........................... H01J 40/14; H04B 10/06
[52] U.S. Cl. ................ 359/172; 250/214 R; 250/214 C; 359/189; 359/194
[58] Field of Search .................................. 359/189, 194, 359/172; 250/214 C, 214 R

[56] References Cited

U.S. PATENT DOCUMENTS 4,431,916   2/1984   Couch ................................ 250/214 R Primary Examiner—Jason Chan
Assistant Examiner—Agustin Bello
Attorney, Agent, or Firm—Louis P. Herzberg

[57] ABSTRACT

This invention provides a solution to the problem of determining how long the peak value detected for the first pulse be kept, and when should it be updated. In infrared communication, the communication distance may vary over time during the transmission. For instance in a mobile infrared telephone the users generally are moving with respect to each other. The signal amplitude changes within a very large range over time and the receiver expected to operate in this environment must also handle a large number of different communication protocols. It uses the instant signal as a basis for adjusting the threshold. The present invention is capable of accepting a wide input dynamic range of signals up to and beyond five orders of magnitude (50 dB). This is accomplished while overcoming the difficulties presented by many communications protocols, by providing a technique in which the output pulse width of an amplified photo detector input is not strongly dependent upon the input signal amplitude.

20 Claims, 6 Drawing Sheets

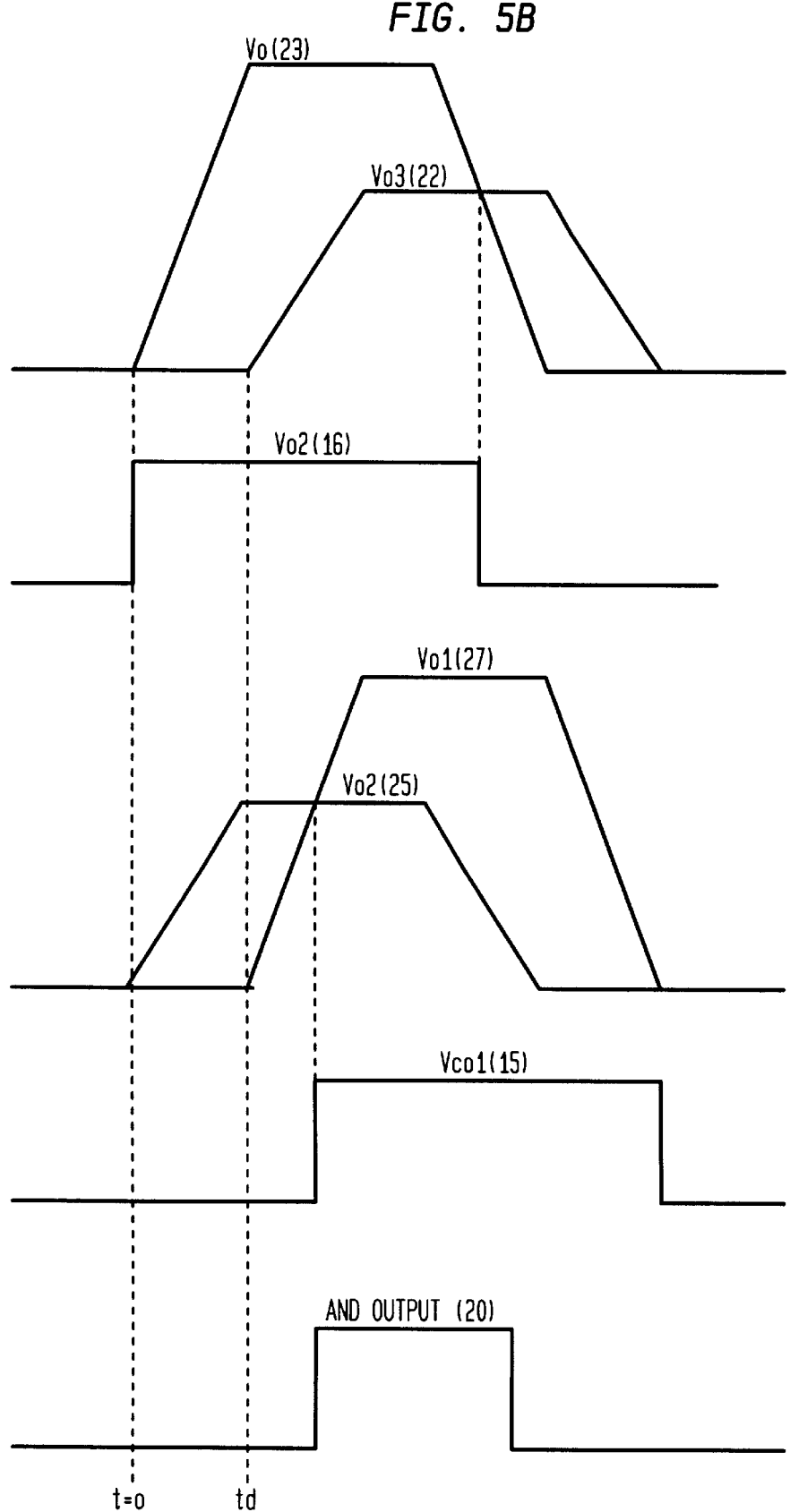

WIRELESS COMMUNICATIONS SYSTEMS WITH SELF THRESHOLD SETTING

FIELD OF THE INVENTION

The present invention relates to wireless communications systems and more particularly to voltage comparator circuits used therein.

BACKGROUND OF THE INVENTION

Wireless or light communication systems, particularly infrared communications systems have a number of problems to deal with in effecting successful communications. One of the characteristics of wireless communications, particularly in infrared communications, is that the signal being received at a receiver may vary by many orders of magnitude because of differences in transmitter power, direction, atmospheric effects, distance, absorption, and other effects that interfere with signal transmission. In addition there is significant noise from other sources of heat and light that interfere with infrared communications. For this purpose, special circuitry has been used to enhance the reception of the true signal being transmitted. The signal being transmitted is typically in the form of digital pulses, which would, under ideal conditions, easily be perceived by the receiver. Because of the interference that may be present, as mentioned, conventional circuits use a comparator which compares the received signal to a threshold value.

In infrared communication, a photo detector is used to detect infrared signals received and produces electric pulses in response to the infrared signals. The electric pulses produced by the photo detector are typically amplified and the resultant amplified digital pulse stream is compared to an internal decision threshold voltage by means of a voltage comparator and based on the comparison made, the comparator will produced an output pulse if the threshold voltage is exceeded.

In other fields of communications a fixed threshold may be satisfactory. However, in the wireless or infrared communications fields, a fixed threshold can cause numerous problems due to the wide variations in the signal. These variations will cause dead zones, fading, and pulse widths that are too wide or too narrow to be handled by the receiving circuitry. When the signal strength is too high, because of a nearby transmitter, for instance, the pulse widths being received may be too large for the receiver circuitry to handle. Correspondingly, when the transmitter is either too weak because of positioning or distance, the pulse width determined by the comparator circuit would be too narrow for reliable processing.

U.S. Pat. No. 4,459,311 issued Oct. 17, 1995, assigned to Hewlett-Packard Company, Palo Alto, Calif., is directed to a fibre optic system of a fixed length that includes both a light source for producing optical signals, and optical fibre coupled to the light source to transmit the optical signals. A photo detector is coupled to the optical fibre to detect those optical signals and convert them to electrical signals. A delay line is coupled to the photo detector to delay the electrical signals from the photo detector for a period sufficient for the decision threshold circuit, which includes a peak detector, to detect the peak voltage of the first pulse received in a communication transmission. The threshold voltage is set to half of the peak voltage of the first digital pulse received. This threshold setting is maintained for the rest of the transmission. In addition, as the peak voltage is used a problem is encountered which requires compensation for a cumulative DC offset voltage.

As the reference is directed to a fibre optics system in which the system itself is a fixed configuration, i.e.: the transmitter, receiver, and optical fibre line are fixed to each other; the variations in signals expected would not result in a large change over short periods of time, e.g. during the currency of a transaction. The variations indicated by the reference vary by no more than 20 dB and this variation is not generally time related. It is apparently related to the length of fibre chosen for each system, and the strength of the transmitter. So a given receiver having an effective range of signal strength acceptance can be used in different fixed installations. The system disclosed apparently cannot compensate for variation in signals during a communication period as it sets its threshold only at the beginning of a communication period.

In the optical fibre communication system, once established the signal amplitude is constant and typically only one communication protocol is used such as SONET (SDH). However, in infrared communication, the communication distance may vary over time during the transmission. For instance in a mobile infrared telephone the users may be moving with respect to each other. The signal amplitude changes within a very large range over time and the receiver expected to operate in this environment must also handle a large number of different communication protocols. This in turn poses a problem which the reference does not appear to be able to handle. In the reference the question left unsolved is how long should the peak value detected for the first pulse be kept, and when should it be updated. As discussed, this is not a critical problem in a fibre optic communication system where one protocol is being used. However, in the infrared field, and when different communication protocols are being used, the pulse duration and pulse separation can be widely different. For the IrDA 2.4 Kbs protocol, the pulse duration varies between 1.41 $\mu$s to 85.55 $\mu$s. For the IrDA 1.152 Mb/s protocol standard the pulse duration may vary between 147.6 to 260.4 ns. This poses a serious problem for prior art systems such as the reference. Experimentation has shown that a peak detection system does not work properly in infrared communications.

It is therefore desirable to use the instant signal as a basis for adjusting the threshold. Another basic problem for wireless communications is due to the base line shift caused by the pAC coupling used to reduce environmental noise. Whereas, it is desirable to handle this situation as well in order to achieve successful communications flexibility peak detection circuits cannot compensate for this.

SUMMARY OF THE INVENTION

The present invention overcomes the difficulties posed by the prior art. In an embodiment the invention is capable of accepting a wide input dynamic range of signals up to and beyond five orders of magnitude (50 dB). This is accomplished while overcoming the difficulties presented by many communications protocols, such as with the pulse position protocol system which is widely used in infrared communications.

Conventional fixed threshold settings cause the output pulse width of an amplified photo detector input to strongly depend on the input signal amplitude. Although the signal may exceed the threshold required for effective communication, the communication will still fail. This is because the output pulse is either too wide or too narrow with respect to the requirements of the communication protocol being used. If a fixed threshold is used, a strong signal may cause a very wide output pulse which may result in two pulses being merged. Conversely, if a small signal is received the resultant pulse may be too narrow to be recognized.

The present invention provides a communication system that can be useful in the infrared spectrum. It includes: a photo detector for detecting infrared signals from an infrared source and converting the infrared signals to electrical signals; a first delay device having an input coupled to the photo detector for delaying the signal from the photo detector for a period of time related to the rise time of an expected electrical signal from the photo detector; a voltage divider having a input coupled to the photo detector for reducing the amplitude of the signal from the photo detector; a second delay device having an input coupled to the output of the voltage divider for delaying the reduced signal from the photo detector for a predetermined period of time related to the fall time of an expected electrical signal from the photo detector; a first voltage comparator coupled to an output of the first delay device and to the output of the voltage divider for comparing the signal received therefrom and adapted to generate the front edge of a voltage output in response to the detection of the front edge of a pulse from said photo detector; a second voltage comparator coupled to the photo detector and to an output of the second delay device for generating the back edge of a voltage output in response to the detection of the back edge of a pulse from the photo detector.

In addition, the invention advantageously provides for the outputs of the first and second comparators to be coupled to the inputs of an AND gate to produce an output pulse from the AND gate when the outputs of the two voltage comparators are active.

BRIEF DESCRIPTION OF THE DRAWINGS

These and other features of the present invention will be better understood with reference to the following detailed description when considered in connection with the accompanying drawings in which:

FIGS. 5A and 5B depict input and output from the implementation of FIG. 2;

DETAILED DESCRIPTION OF THE INVENTION

Figure 1:
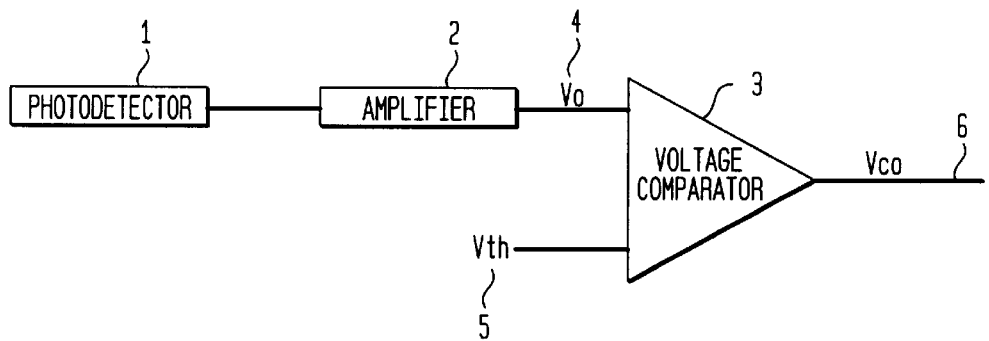
FIG. 1 is a generalized block diagram representation of an infrared communication circuit having a fixed threshold in accordance with the prior art.

Referring to FIG. 1, an infrared communication system having a fixed voltage threshold input Vth is illustrated. The system includes a photo detector 1 coupled to an amplifier 2 the output of which, $V_o$ is fed to the input 4 of voltage comparator 3. In addition, comparator 3 is provided with a fixed threshold voltage at input 5.

When voltage comparator 3 is presented with an electrical pulse on input 4 from the amplified output of the photo detector 1, an output $V_{co}$ will be produced at the output at terminal 6, in accordance with detected pulses received that exceed the fixed threshold voltage.

It has been found that such a circuit is incapable of handling a wide input dynamic range of up to or more than five orders in magnitude (50 dB) which may occur in infrared communications. In addition, the protocol of the pulse position modulation that is widely used in infrared communications requires a circuit output pulse width to fall within specific limitations as described previously. The conventional fixed threshold circuit of FIG. 1, will have an output voltage pulse width (from voltage comparator 3) strongly dependent on the input signal amplitude. If the signal amplitude exceeds the threshold by a large amount, the communications will fail because the output pulse will be too wide to be acceptable to the infrared communication protocol. If the input pulse is too weak to exceed the threshold by a significant amount, the communication will fail because the output pulse will be too narrow to fall within the requirements of the communication protocol.

An analysis of the pulse width dependency of the circuit of FIG. 1 is discussed below:

When the fixed threshold $V_{th}$ is set to half minimum input pulse amplitude multiplied by the system small signal gain (i.e. no saturation effects), the output pulse width of $V_{co}$ is given as:

$$Pw_o PW_i + \tau Ln\{(2V_{in}/V_{min}-1)*[1-\exp(-PW_i/\tau)]\} \qquad (1)$$

Where:

$Pw_o$ is the output pulse width of $V_{co}$ $Pw_i$ is the input pulse width, $V_{in}$ is the input pulse amplitude, $\tau$ is the system time constant, and $\tau=(2\pi BW)^{-1}$, BW is the system bandwidth, Ln is the natural logarithm, and exp is the natural exponential A detailed calculation of this is shown below.

As can be seen, the output pulse width depends on the input pulse amplitude. It should be pointed out especially that when t=T, the input pulse period, then at the moment the next pulse starts, there is still a residual voltage, $V_{re}$ present from the previous pulse where $$V_{re}=[1-\exp(-PW_i/\tau)]*\exp[-(T-PW_i)/\tau]*K*V_{in} \qquad (2)$$

where:

K is the system small signal gain

T is the input pulse period

When the input pulse amplitude is large enough so that $V_{re}$ reaches the level of $V_{th}$, it results in the merger of the two pulses into one, and the communication definitely fails. This limits the system input dynamic range to:

$$V_{re}=V_{th}=Kv_{min}/2$$

or $$V_{max}/V_{min}=\exp[-(T-PW_i)/\tau)]/\{2*[1-\exp(-PW_i/\tau)]\}$$

where $V_{max}$ is the maximum input pulse amplitude

Using 4 Mb/s IrDA protocol and a fixed threshold the dynamic range is limited to about 2 orders (i.e. 20 dB) of magnitude. This is not sufficient for the general wireless or light communication application. The present invention provides a solution to this problem. It uses a comparator in which the comparator threshold is not fixed but is derived from the photo detector amplifier output itself. In this way, when the input pulse received is large the threshold voltage becomes high. When the input pulse received is small, the threshold voltage is reduced. In this manner the output pulse width is kept relatively constant, irrespective of the magnitude of the input pulse amplitude.

Figure 2:
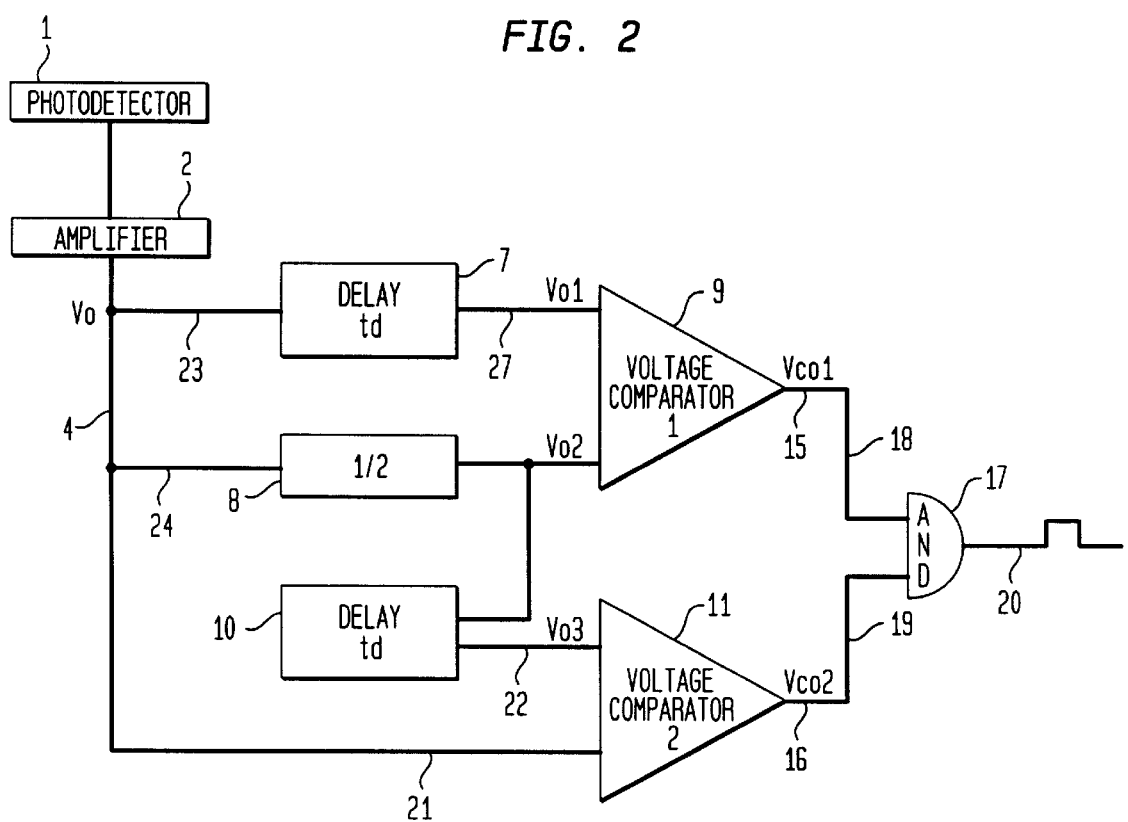
FIG. 2 is a block representation showing a specific implementation of the present invention.

One embodiment in accordance with the present invention employing self threshold setting, is shown in FIG. 2. FIG. 2 shows a communication circuit which comprises a photo detector 1 capable of detecting infrared signals from an infrared transmitter source, and converting the infrared signals to electrical signals. The output of the photo detector is amplified by amplifier 2 to produce a photo detector output voltage $V_o$ on line 4. A first delay device 7 has an input 23 coupled to the output of the amplified photo detector output on line 4. It delays the signal from the photo detector for a predetermined period of time $t_d$. Delay time $t_d$ is related to the rise time $t_r$ of the expected electrical signal from the photo detector. It is advantageous that delay time $t_d$ be close to the rise time $t_r$. Thus, in the case of the 4 Mb/s IrDA protocol with a rise time of 35 ms a time delay $t_d$ of 20 to 50 ns is effective. Less delay can be used if signal noise is small and the offset voltages of the comparators is small. Voltage divider 8 has an input 24 is coupled to the amplified photo detector output and divides the amplitude of the signal from the photo detector by a predetermined amount. In the case of FIG. 2, it is dividing the signal by two.

A first voltage comparator 9 is coupled to output signal 27 of the first delay device 7 and to the output signal 25 of the voltage divider 8. It compares these output signals to generate the front edge of a voltage output $V_{co1}$ on upper terminal 15. This is the response to the detected front edge of a pulse from the photo detector 1. A second delay device 10 has an input 26 coupled to the output 25 of voltage divider 8 for delaying the signal from the voltage divider 8 for the delay time $t_d$. Its output 22 feeds the second voltage comparator 11. The second voltage comparator 11 is coupled at input terminal 21 to the amplified photo detector output, and at terminal 22 to the output 28 of the second delay device 10. It generates the voltage output 16 $V_{co2}$ in response to the detection of the back edge of a pulse from the photo detector 1.

The voltage comparator outputs 15 and 16 respectively of voltage comparators 9 and 11 are coupled to AND gate 17. And gate 17 produces an output pulse 20 on its output gate in response the outputs of voltage comparators 9 and 11. Output pulse 20 will corresponds in width with the pulse received by photo detector 1. Its pulse width is relatively independent of the input amplitude of the signal received by the photo detector 1.

In operation, the output 20 of AND gate 17 comprises a series of pulses in accordance with the infrared pulses detected by photo detector 1. It is further processed by circuitry and or software in accordance with the processing requirements of the signals detected by the photo detector 1 in a manner known to those familiar with the art.

In the embodiment of FIG. 2, the amplifier output signal $V_o$ is delayed in time and/or divided by 2 in amplitude to generate $V_{o1}$ 27, but $V_{o2}$ 25 and $V_{o3}$. Thus:

$V_{o1}$ 27 has the same amplitude as $V_o$, but is delayed to $t_d$ in time.

$V_{o2}$ 25 has half the amplitude of $V_{o4}$, but is not delayed.

$V_{o3}$ 22 has half the amplitude of $V_o$, and is delayed by $t_d$ in time.

$V_{o1}$ 27 and $V_{o2}$ 25 are connected to the inputs of voltage comparator 9 to generate the front edge of the circuit output pulse.

$V_o$ 4 and $V_{o3}$ 22 are connected to the inputs of voltage comparator 11 to generate the back edge of the circuit output pulse.

$V_{o2}$ and $V_{o3}$ are essentially used as the thresholds of the comparators. Their values are not preset to a fixed value, but depend on the signal amplitude itself. This is herein called self threshold setting.

The output pulse width is shown below:

$$Pw_o = \tau * \ln\{[2*\exp(PW_i/\tau) - 2 + \exp(t_d/\tau)]/[2*\exp(t_d/\tau) - 1]\} \quad (3)$$

where $t_d$ is the delay time for $V_{o2}$ and $V_{o3}$ and other variables are the same as in equation (1) above. Equation (3) shows the circuit output pulse width is independent of the input amplitude, and accordingly all problems caused by dependence of output pulse width on input amplitude have been solved. A detailed derivation of equation (3) is given below.

Generally, a choice of delay time that will produce satisfactory results in this invention depends upon the bandwidth of the communication system being considered. It is advantageous that the delay time $t_d$ should be approximately the same as the rise time of a pulse $t_r$. The art that the rise time of a pulse is defined as the time interval that it takes for the pulse to rise from 10% of the pulse amplitude to 90% of the final pulse amplitude. It is well known that the communication system bandwidth determines pulse rise time and that pulse rise time can be calculated according to the formula $[t_r=350/bandwidth]$. The rise time is given in nanoseconds when the bandwidth is represented in Megahertz. Much of the current IR technology uses a bandwidth kept to 10 Megahertz or less. This results in a pulse rise time expected in such a system for a pulse is 35 nanoseconds or longer.

It has been found that the amplitude ratio chosen in this embodiment for the voltage divider, namely 0.5 is a satisfactory value as it tends to keep the output pulse width approximately the same as the pulse width of the input provided to it. Other embodiments may use other divider ratios.

In the high speed infrared field, one of the applications for which this invention is adapted, the rise and fall times of pulses being transmitted are very fast and the pulse widths are so narrow causing the pulse shape to approach a bell shape curved rise and falling edges. The pulse generated by the comparator circuit in response to this is a shaped pulse that is suitable for use by digital processing and decoding circuits following or attached to this device.

Figure 3:
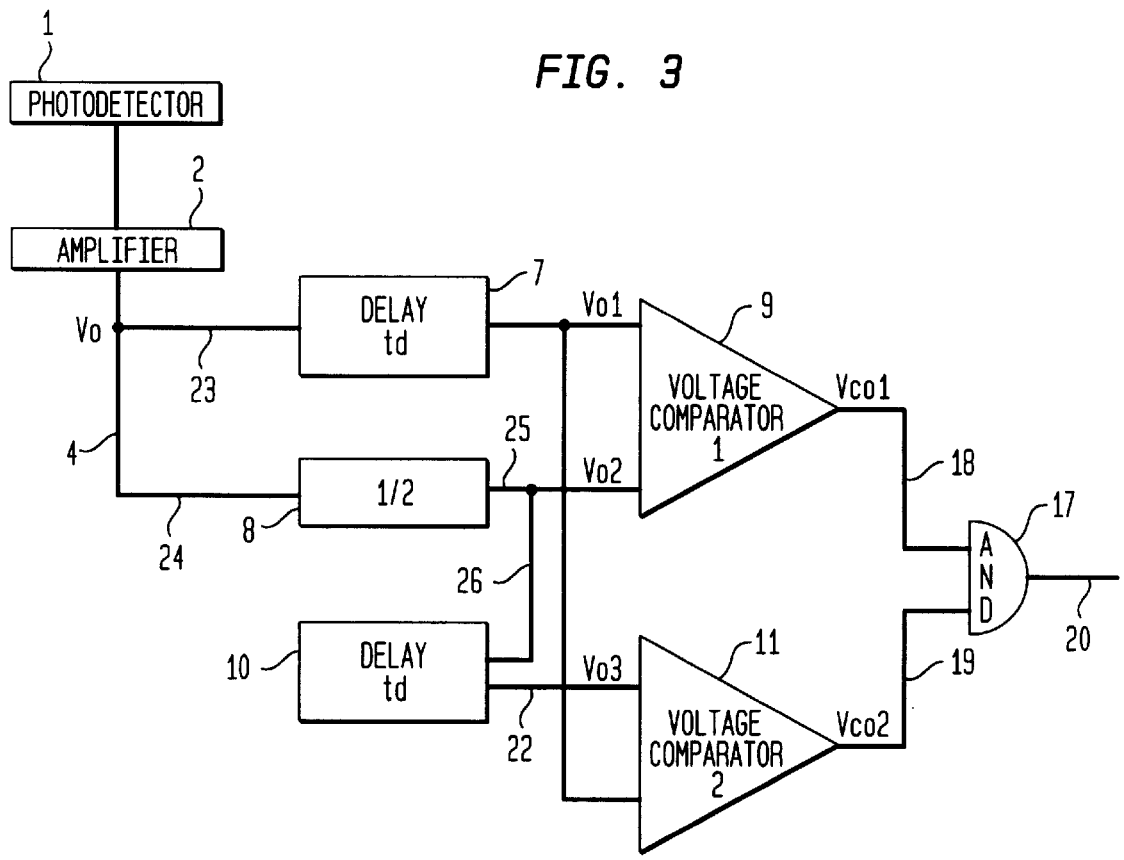
FIG. 3 is a block representation showing a second specific implementation of the present invention.
Figure 4:
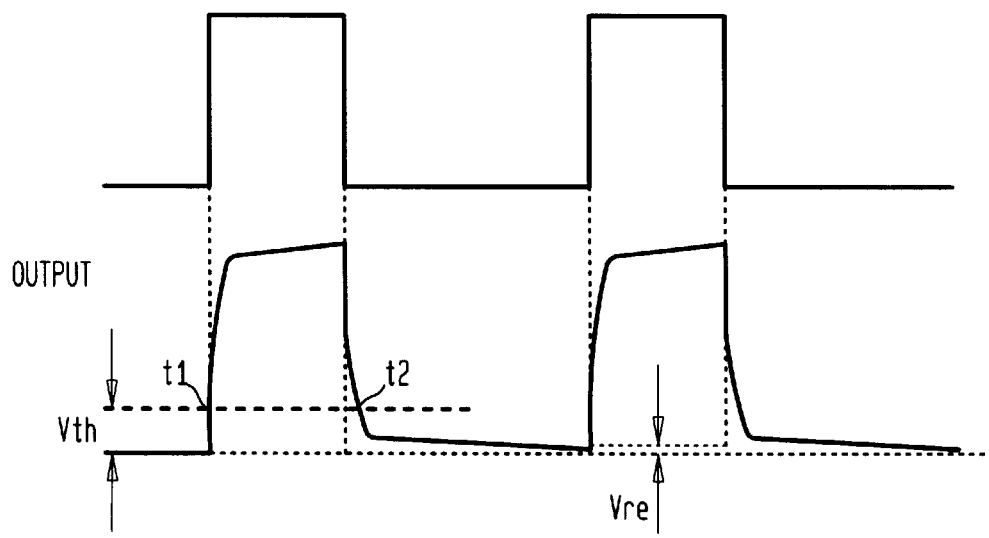
FIG. 4 depicts input and output waveforms for the circuit of FIG. 1.
Figure 5A:
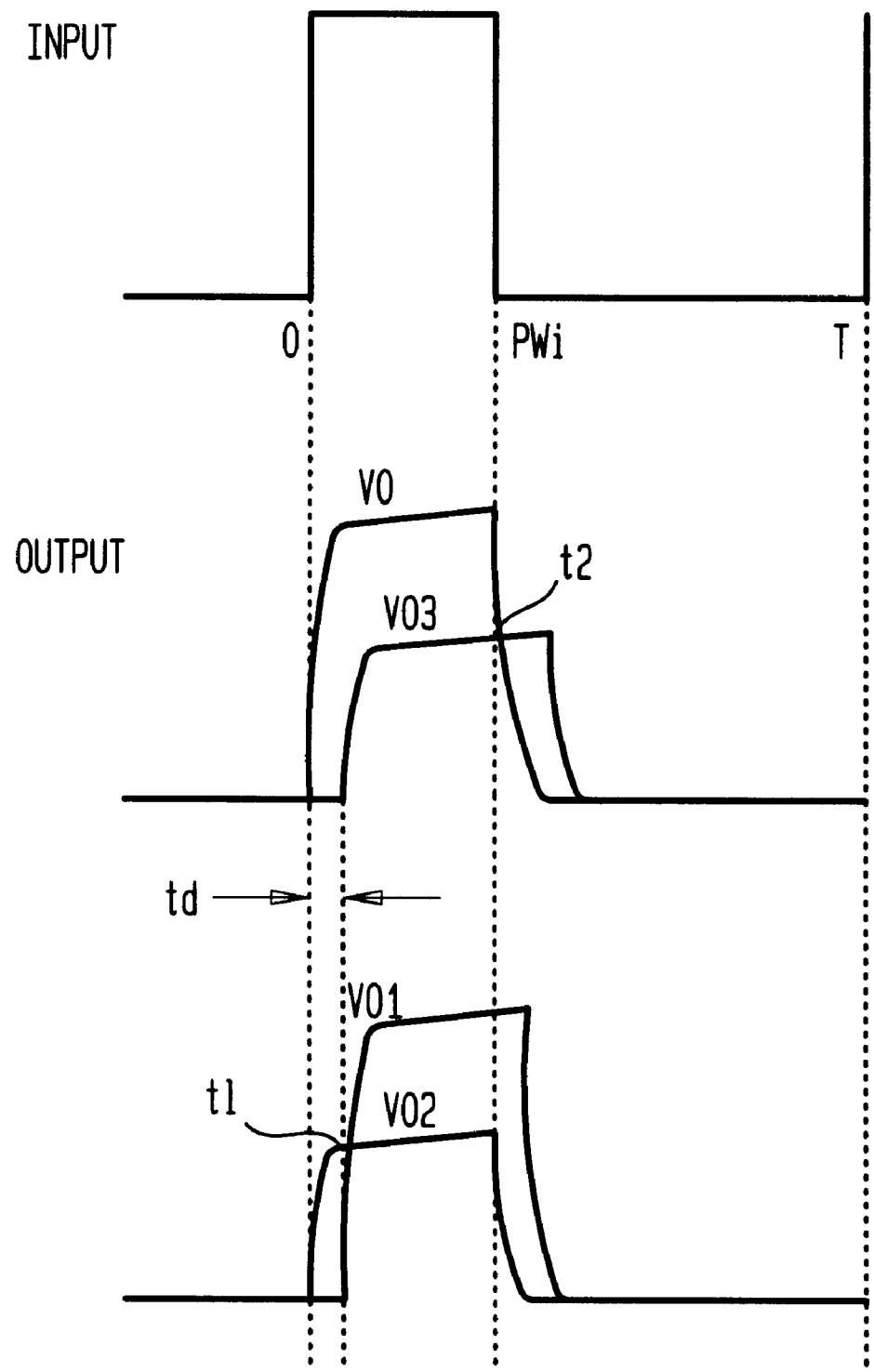

FIG. 3 shows another embodiment of the present invention. The output pulse width of this circuit is kept very close to the width of the output from the photo detector. The pulse wave forms for the prior art are shown in FIG. 4. The pulse wave forms for this embodiment are shown in FIGS. 5A and 5B. Referring to FIGS. 5A and 5B, the second comparator 11 receives as its inputs the output of the first delay device 7 and the output of the second delay device 10. Delay device 10 is adapted in this embodiment to delay the signal by approximately $2 t_d$ (i.e. Twice as much as imposed by the first delay circuit).

The delay devices depicted in the drawings and text have not been discussed in detail as those familiar with the art would be well able to use suitable devices in order to achieve the objectives of the invention without difficulty. Suitable delay devices would include RC filters and analog delay lines or such other devices as may be known in the art.

FIG. 4 shows typical waveforms for the prior art circuit of FIG. 1. The following give a calculation of output pulse width of the fixed threshold circuit of FIG. 1 when considered, together with FIG. 4.

$$V_0(t) = \begin{cases} \left[1-\exp\left(-\dfrac{t}{\tau}\right)\right] K\ Vin & 0 \le t \le PWi \\ \left[1-\exp\left(-\dfrac{PWi}{\tau}\right)\right] K\ Vin\ \exp\left(-\dfrac{t-PWi}{\tau}\right) & PWi < t \le T \\ \left[1-\exp\left(-\dfrac{PWi}{\tau}\right)\right] K\ Vin\ \exp\left(-\dfrac{T-PWi}{\tau}\right) + \left[1-\exp\left(-\dfrac{t-T}{\tau}\right)\right] K\ Vin & T < t \le T+1 \end{cases}$$

Where:

Vo(t) is the amplifier output
exp is the natural exponential function
$\tau$ is the system time constraint, $\tau = (2\pi BW)^{-1}$
BW is the system bandwidth
K is the system small signal gain
Vin is the input pulse amplitude
PWi is the input pulse width
T is the input pulse period
Usually the threshold is preset to ½ K Vmin, that is:

Vth=½ K Vmin

Where:

| Vth | is the fixed threshold value 210 |
| K | is the system small signal gain |
| Vmin | is the minimum input pulse amplitude |

The cross point time $t_1$ 220 of the output pulse front edge 210 and the threshold 230 is determined from:

$$\left[1-\exp\left(-\frac{t_1}{\tau}\right)\right] K\ Vin = Vth = \frac{1}{2} K\ Vmin$$

$$t_1 = -\tau\ \ln\left(\frac{2Vin - Vmin}{2Vin}\right)$$

The cross point time $t_2$ 240 of the output pulse back edge 250 and the threshold 230 is determined from:

$$\left[1-\exp\left(-\frac{PWi}{\tau}\right)\right] K\ Vin\ \exp\left(-\frac{t_2 - PWi}{\tau}\right) = Vth = \frac{1}{2} K\ Vin$$

$$t_2 = \tau\ \ln\frac{Vmin}{2\left[1-\exp\left(-\dfrac{PWi}{\tau}\right)\right]Vin} + PWi$$

The circuit output pulse width $t_2$ 240 minus $t_1$ 220 is given by:

$$PWo = t_2 - t_1 = PWi + \tau\ \ln\left(\frac{2Vin}{Vmin} - 1\right)\left[1-\exp\left(-\frac{PWi}{t}\right)\right]$$

FIGS. 5A and 5B show typical waveforms for the circuit of FIG. 2. The following gives a calculation of output pulse width of the circuit of FIG. 2 when considered together with FIGS. 5A and 5B. The mathematical expressions of Vo, $Vo_1$, $Vo_2$ and $Vo_3$ are:

$$V_o(t) = \begin{cases} \left[1-\exp\left(-\dfrac{t}{\tau}\right)\right] K\ Vin & 0 \le t \le PWi \\ \left[1-\exp\left(-\dfrac{PWi}{\tau}\right)\right] K\ Vin\ \exp\left(-\dfrac{t-PWi}{\tau}\right) & PWi < t \le T \end{cases} \quad (1)$$

(2) above, $$V_{o1}(t) = \begin{cases} 0 \\ \left[1-\exp\left(-\dfrac{t-td}{\tau}\right)\right] K\ Vin \\ \left[1-\exp\left(-\dfrac{PWi}{\tau}\right)\right] K\ Vin\ \exp\left(-\dfrac{t-PWi-td}{\tau}\right) \end{cases} \quad V_{o2}(t) = \begin{cases} \dfrac{1}{2}\left[1-\exp\left(-\dfrac{t}{\tau}\right)\right] \\ \dfrac{1}{2}\left[1-\exp\left(-\dfrac{PWi}{\tau}\right)\right] \end{cases}$$

(3) above, $$V_{o3}(t) = \begin{cases} 0 \\ \dfrac{1}{2}\left[1-\exp\left(-\dfrac{t-td}{\tau}\right)\right] K\ Vin \\ \dfrac{1}{2}\left[1-\exp\left(-\dfrac{PWi}{\tau}\right)\right] K\ Vin\ \exp\left(-\dfrac{t-PWi-td}{\tau}\right) \end{cases} \quad (4)$$

(2) and (3) determine the cross-point of t1, the output pulse front edge:

$$K\ Vin\left[1-\exp\left(-\frac{t_1-t_d}{\tau}\right)\right] = \frac{1}{2}$$

$$t_1 = \tau \ln\left[2\exp\left(\frac{t_d}{\tau}\right) - 1\right]$$

(1) and (4) determine the cross-point of t2, the output pulse back edge:

$$K\,Vin\left[1 - \exp\left(\frac{PWi}{\tau}\right)\right]\exp\left(-\frac{t_2 - P}{\tau}\right)$$

$$t_2 = \tau \ln\left\{2\left[\exp\left(-\frac{PWi}{\tau}\right) - 1\right] + \exp\left(\frac{t_d}{\tau}\right)\right\}$$

The circuit output pulse width PWo is:

$$PWo = t_2 - t_1 = \tau \ln\left\{\frac{2\exp\left(\frac{PWi}{\tau}\right) - 2 + \exp\left(\frac{t_d}{\tau}\right)}{2\exp\left(\frac{t_d}{\tau}\right) - 1}\right\}$$

Figure 6A:
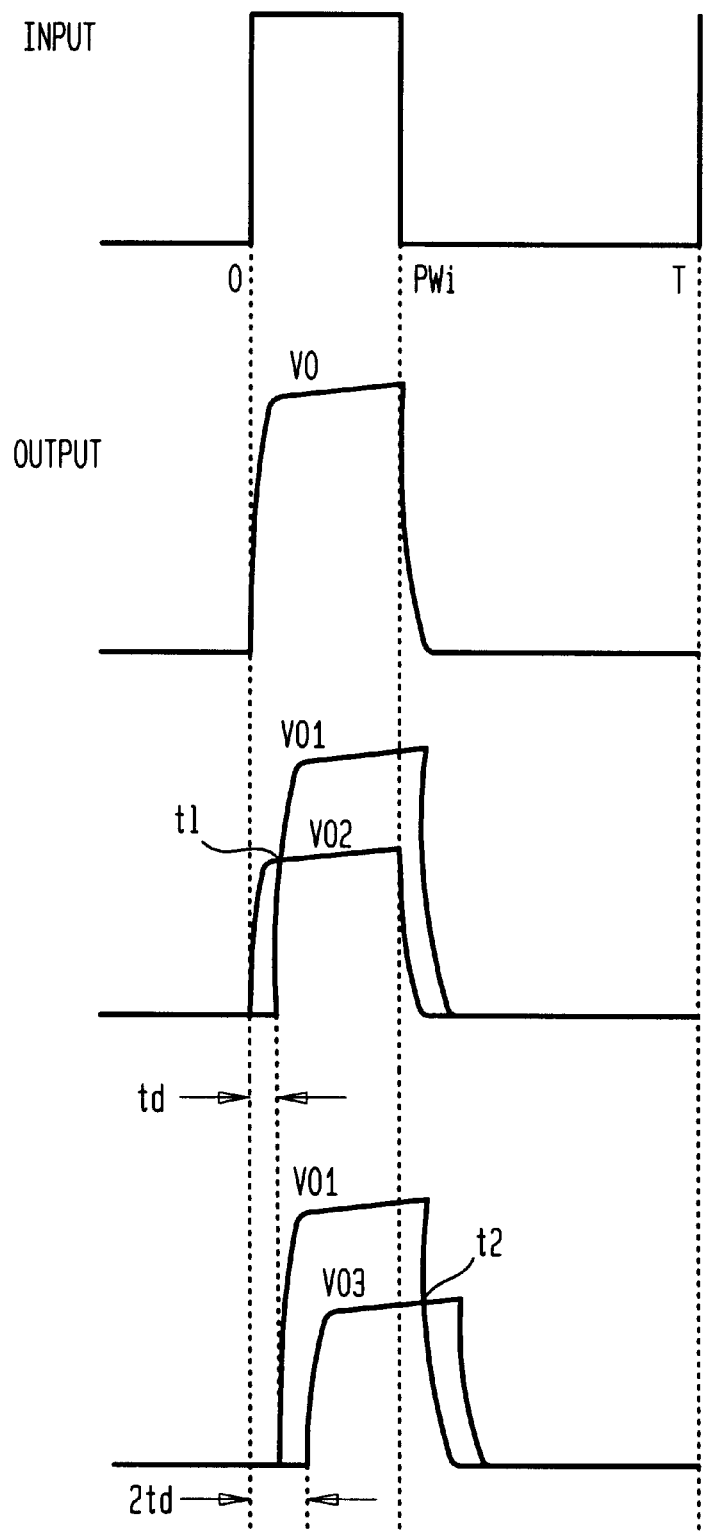
FIGS. 6A and 6B depict input and output waveforms for the FIG. 3 implementation.
Figure 6B:
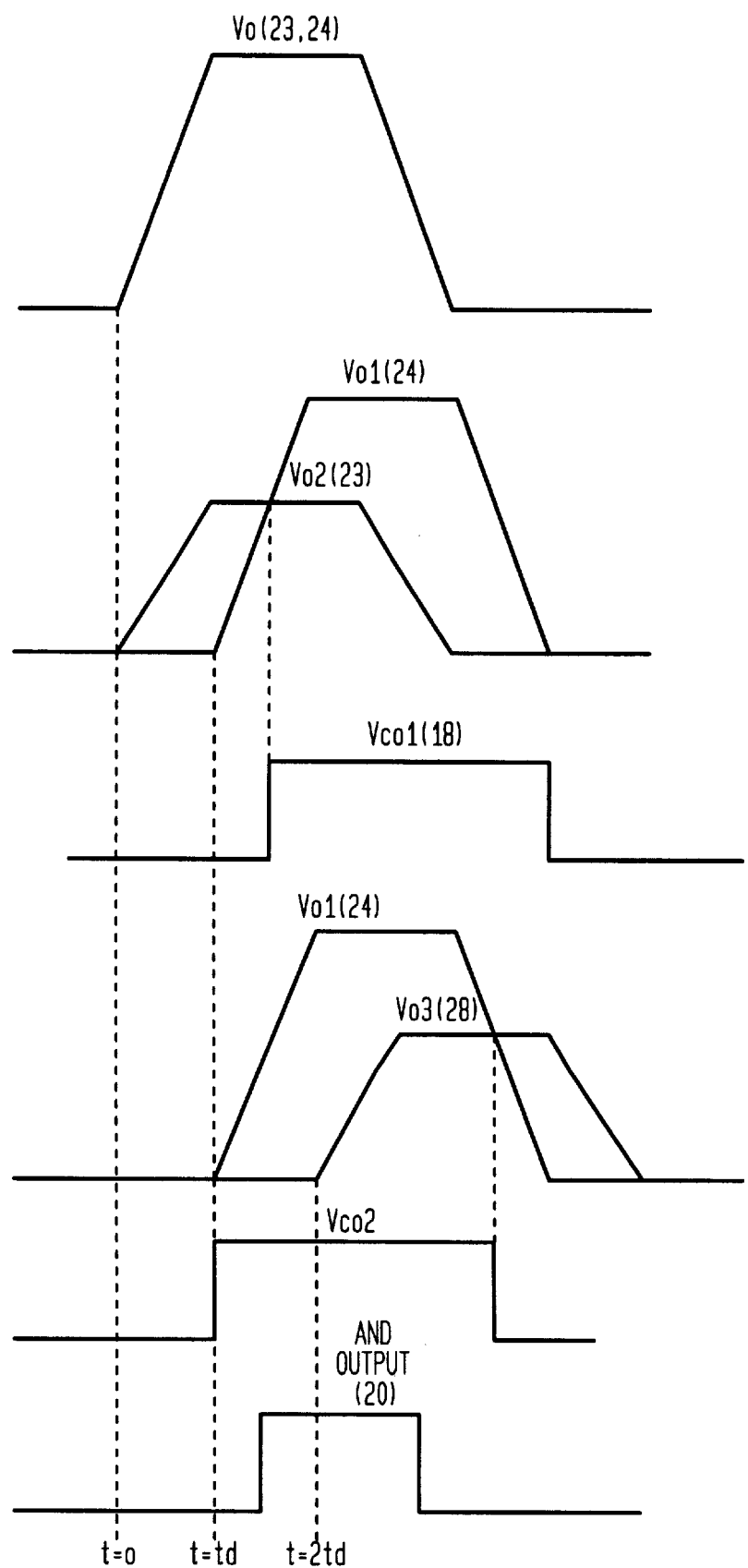

FIGS. 6A and 6B show typical waveforms for the circuit of FIG. 3.

While the circuitry of the invention has been described mostly in the context of infrared communications, it can be appreciated that the invention can be applied to other wireless communications. Although the present invention has been described with reference to a few specific embodiments, the descriptions of these embodiments are illustrative of the invention and are not to be construed as limiting the invention. Various modifications to the invention may be made by those skilled in the art without departing from the true spirit and scope of the invention as defined by the appended claims.

APPENDIX A

Calculation of Output Pulse Width (Fixed Threshold)

This Appendix, taken together with FIG. 4, illustrates the behavior of the circuit of FIG. 1.

$$V_o(t) = \begin{cases} \left[1 - \exp\left(-\frac{t}{\tau}\right)\right]K\,Vin & 0 \le t \le PWi \\ \left[1 - \exp\left(-\frac{PWi}{\tau}\right)\right]K\,Vin\exp\left(-\frac{t - PWi}{\tau}\right) & PWi < t \le T \\ \left[1 - \exp\left(-\frac{PWi}{\tau}\right)\right]K\,Vin\exp\left(-\frac{T - PWi}{\tau}\right) + \left[1 - \exp\left(-\frac{t - T}{\tau}\right)\right]K\,Vin & T < t \le T + PWi \end{cases}$$

Where
- $V_o(t)$ = amplifier output
- exp = natural exponential function
- $\tau$ = system time constraint, $\tau = (2\pi BW)^{-1}$
- BW = system bandwidth
- K = system small signal gain
- Vin = input pulse amplitude
- PWi = input pulse width
- T = input pulse period Usually the threshold is preset to ½ K Vmin, that is:
- Vth = ½ K Vmin Where
- Vth = fixed threshold value
- K = system small signal gain
- Vmin = minimum input pulse amplitude Calculation of $t_1$, the cross point of the output pulse front edge and the threshold:

$$\left[1 - \exp\left(-\frac{t_1}{\tau}\right)\right]K\,Vin = Vth = \frac{1}{2}K\,Vmin$$

$$t_1 = -\tau \ln\left(\frac{2Vin - Vmin}{2Vin}\right)$$

Calculation of $t_2$, the cross point of the output pulse back edge and the threshold:

$$\left[1 - \exp\left(-\frac{PWi}{\tau}\right)\right]K\,Vin\exp\left(-\frac{t_2 - PWi}{\tau}\right) = Vth = \frac{1}{2}K\,Vmin$$

$$t_2 = \tau \ln\frac{Vmin}{2\left[1 - \exp\left(-\frac{PWi}{\tau}\right)\right]Vin} + PWi$$

The circuit output pulse width:

$$PWo = t_2 - t_1 = PWi + \tau \ln\left(\frac{2Vin}{Vmin}\right)\left[1 - \exp\left(-\frac{PWi}{\tau}\right)\right]$$

APPENDIX B

Calculation of Output Pulse Width (Circuit of FIG. 2)

This Appendix, together with the circuit of FIG. 5, illustrates the behavior of the circuit of FIG. 2. The math expression of $V_o$, $V_{o1}$, $V_{o2}$ and $V_{o3}$ are shown below:

$$V_o(t) = \begin{cases} \left[1 - \exp\left(-\frac{t}{\tau}\right)\right] K V_{in} & o \leq t \leq PW_i \\ \left[1 - \exp\left(-\frac{PW_i}{\tau}\right)\right] K V_{in} \exp\left(-\frac{t - PW_i}{\tau}\right) & PW_i < t \leq T \end{cases} \quad (1)$$

$$V_{o1}(t) = \begin{cases} o & t < td \\ \left[1 - \exp\left(-\frac{t - td}{\tau}\right)\right] K V_{in} & td \leq t \leq PW_i + td \\ \left[1 - \exp\left(-\frac{PW_i}{\tau}\right)\right] K V_{in} \exp\left(-\frac{t - PW_i - td}{\tau}\right) & PW_i + td < t \leq T + td \end{cases} \quad (2)$$

$$V_{o2}(t) = \begin{cases} \frac{1}{2}\left[1 - \exp\left(-\frac{t}{\tau}\right)\right] K V_{in} & o \leq t \leq PW_i \\ \frac{1}{2}\left[1 - \exp\left(-\frac{PW_i}{\tau}\right)\right] K V_{in} \exp\left(-\frac{t - PW_i}{\tau}\right) & PW_i < t \leq T \end{cases} \quad (3)$$

$$V_{o3}(t) = \begin{cases} o & o < t < td \\ \frac{1}{2}\left[1 - \exp\left(-\frac{t - td}{\tau}\right)\right] K V_{in} & td \leq t \leq PW_i + td \\ \frac{1}{2}\left[1 - \exp\left(-\frac{PW_i}{\tau}\right)\right] K V_{in} \exp\left(-\frac{t - PW_i - td}{\tau}\right) & PW_i + td < t \leq T + td \end{cases} \quad (4)$$

(2) and (3) determine the cross-point of t1, the output pulse front edge:

$$K V_{in}\left[1 - \exp\left(-\frac{t_1 - t_d}{\tau}\right)\right] = \frac{1}{2} K V_{in}\left[1 - \exp\left(\frac{t_1}{\tau}\right)\right]$$

$$t_1 = \tau \ln\left[2 \exp\left(\frac{t_d}{\tau}\right) - 1\right]$$

(1) and (4) determine the cross-point of t2, the output pulse back edge:

$$K V_{in}\left[1 - \exp\left(-\frac{PW_i}{\tau}\right)\right] \exp\left(-\frac{t_2 - PW_i}{\tau}\right) = \frac{1}{2} K V_{in}\left[1 - \exp\left(\frac{t_2 - t_d}{\tau}\right)\right]$$

$$t_2 = \tau \ln\left\{2\left[\exp\left(-\frac{PW_i}{\tau}\right) - 1\right] + \exp\left(\frac{t_d}{\tau}\right)\right\}$$

The circuit output pulse width $PW_o$ is:

$$PW_o = t_2 - t_1 = \tau \ln\left\{\frac{2\exp\left(\frac{PW_i}{\tau}\right) - 2 + \exp\left(\frac{t_d}{\tau}\right)}{2\exp\left(\frac{t_d}{\tau}\right) - 1}\right\}$$

What is claimed is:

1. A communication system comprising:

a photo detector having a photo detector input for receiving communication signals from a transmitting source, and having a photo detector output for providing electrical output signals;

a first delay line having a first delay input and a first delay output, said first delay input being coupled to said detector output, said first delay line for delaying said electrical output signals by a predetermined delay period;

a voltage divider having a divider input and a divider output, said divider input being coupled to said photo detector output, said voltage divider for dividing said electrical output signals by a fixed ratio;

a first voltage comparator having a first comparator first input, a first comparator second input and a first comparator output, said first comparator first input being coupled to said first delay output, said first comparator second input being coupled to said divider output;

a second delay having a second delay input and a second delay output, said second delay input being coupled to said divider output, said second delay line for delaying said divider output by said predetermined delay period; and a second comparator having a second comparator first input, a second comparator second input and a second comparator output, said second comparator first input being coupled to said photo detector output, said second comparator second input being coupled to said second delay output.

2. A system as recited in claim 1, further comprising an AND gate having a first AND gate input, a second AND gate input and an AND gate output, said first AND gate input being coupled to said first comparator output, said second AND gate input being coupled to said second comparator output.

3. A system as recited in claim 1, wherein said divider ratio is one half.

4. A system as recited in claim 1, wherein said predetermined delay period has a relationship to a pulse rise time expected when said electrical output signals are pulses.

5. A system as recited in claim 4 wherein said relationship is equality.

6. A system as recited in claim 1, wherein said photo detector comprises a circuit comprising a detector element and an amplifier for amplifying the output of said detector element.

7. A system as recited in claim 1, wherein said transmitting source is an infrared transmitter and said photo detector is for detecting infrared signals.

8. A system as recited in claim 1, wherein said transmitting source is a wireless transmitter.

9. A circuit comprising:
   a photo detector having a photo detector input for receiving communication signals from a transmitting source, and having a photo detector output for providing electrical output signals;
   a first delay line having a first delay input and a first delay output, said first delay input being coupled to said detector output, said first delay line for delaying said electrical output signals by a predetermined delay period;
   a voltage divider having a divider input and a divider output, said divider input being coupled to said photo detector output, said voltage divider for dividing said electrical output signals by a fixed ratio;
   a first voltage comparator having a first comparator first input, a first comparator second input and a first comparator output, said first comparator first input being coupled to said first delay output, said first comparator second input being coupled to said divider output;
   a second delay having a second delay input and a second delay output, said second delay input being coupled to said divider output, said second delay line for delaying said divider output by said predetermined delay period; and
   a second comparator having a second comparator first input, a second comparator second input and a second comparator output, said second comparator first input being coupled to said first delay output, said second comparator second input being coupled to said second delay output.

10. A system as recited in claim 9, further comprising an AND gate having a first AND gate input, a second AND gate input and an AND gate output, said first AND gate input being coupled to said first comparator output, said second AND gate input being coupled to said second comparator output.

11. An infrared communication system comprising:
    a photo detector for detecting infrared signals from an infrared transmitter source and converting the infrared signals to electrical signals;
    a first delay device having a input coupled to said photo detector for delaying a signal from said photo detector for a predetermined period of time related to the rise time of an expected electrical signal from said photo detector;
    a voltage divider having an input coupled to said photo detector for reducing the amplitude of said signal from said photo detector;
    a second delay device having an input coupled to said output of said voltage divider for delaying said reduced signal from said photo detector for a predetermined period of time related to the fall time of an expected electrical signal from said photo detector;
    a first voltage comparator coupled to an output of said first delay device and to an output of said voltage divider for comparing the signals received therefrom and adapted to generate the front edge of a voltage output in response to the detection of the front edge of a pulse from said photo detector; and
    a second voltage comparator having an input coupled to said photo detector into an output of said second delay device for generating back edge of a voltage output in response to detection of the back edge of a pulse from said photo detector.

12. A system as recited in claim 11, wherein said second voltage comparator has a second input coupled to the output of said photo detector.

13. A system as recited in claim 11, wherein said second voltage comparator has a second input coupled to the output of said first delay device and wherein said second delay device is adapted to delay a signal input from said photo detector by a multiple of said predetermined delay time of said first delay device.

14. A system as recited in claim 13, wherein said multiple equals 2.

15. A system as recited in claim 11, in which the outputs of said first and second comparators are coupled to the input of an AND gate to produce an output pulse from said AND gate when the outputs of said voltage comparators are both active.

16. A system as recited in claim 11, wherein said photo detector comprises a circuit comprising a photo detector element and an amplifier for amplifying the output of said photo detector element.

17. A circuit for a light communication system having a photo detector for detecting light signals from a light transmitter source and converting the light signals to electrical signals, said circuit comprising:
    a first delay device having a input coupled to said photo detector for delaying a signal from said photo detector for a predetermined period of time related to the rise time of an expected electrical signal from said photo detector;
    a voltage divider having an input coupled to said photo detector for reducing the amplitude of said signal from said photo detector;
    a second delay device having an input coupled to said output of said voltage divider for delaying said reduced signal from said photo detector for a predetermined period of time related to the fall time of an expected electrical signal from said photo detector;
    a first voltage comparator coupled to an output of said first delay device and to an output of said voltage divider for comparing the signals received therefrom and adapted to generate the front edge of a voltage output in response to the detection of the front edge of a pulse from said photo detector; and
    a second voltage comparator having an input coupled to said photo detector into an output of said second delay device for generating back edge of a voltage output in response to detection of the back edge of a pulse from said photo detector.

18. A system as recited in claim 17, wherein said second voltage comparator has a second input coupled to the output of said photo detector.

19. A system as recited in claim 17, wherein said second voltage comparator has a second input coupled to the output of said first delay device and wherein said second delay device is adapted to delay a signal input from said photo detector by a multiple of said predetermined delay time of said first delay device.

20. A system as recited in claim 13, wherein said multiple equals 2.

* * * * *